E. L. PERKINS.
Paper Drier.
No. 1,056.
Reissued Oct. 9, 1860.
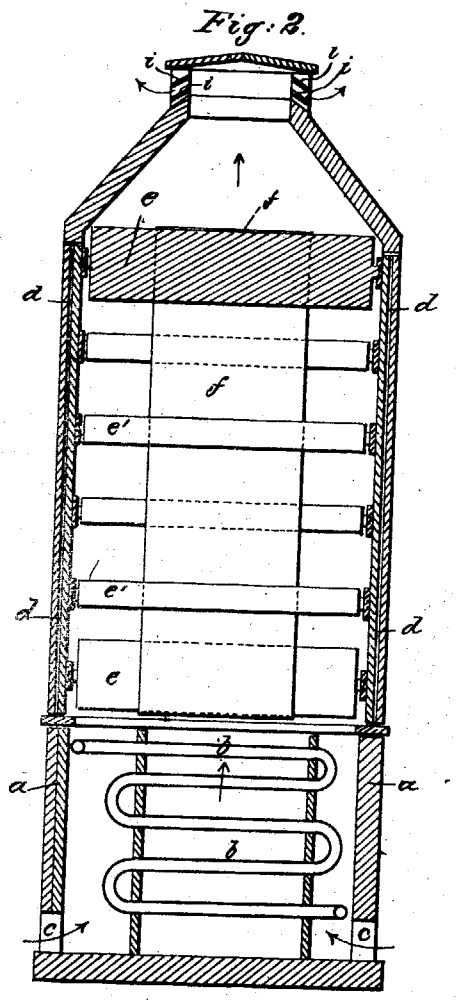
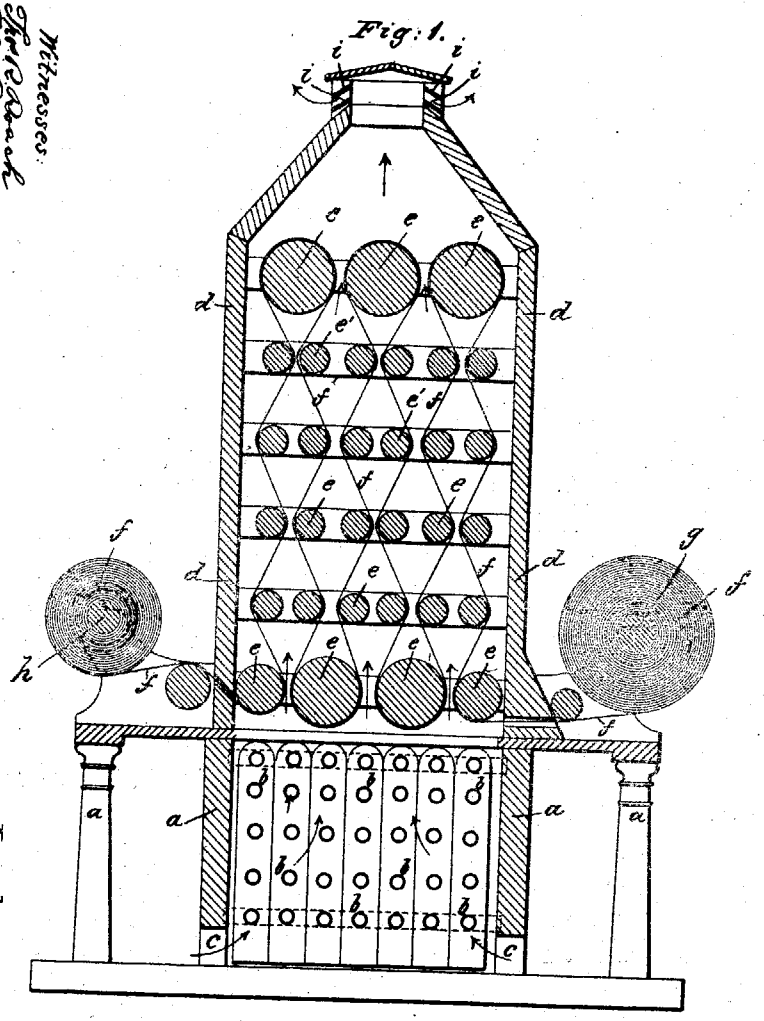
Witnesses:
Thos P. Roach
R. Fischermacher
Inventor:
Edward L. Perkins

UNITED STATES PATENT OFFICE.

EDWARD L. PERKINS, OF ROXBURY, MASSACHUSETTS.

IMPROVEMENT IN MACHINES FOR DRYING PAPER AND OTHER FABRICS.

Specification forming part of Letters Patent No. 24,328, dated June 7, 1859; Reissue No. 1,056, dated October 9, 1860.

*To all whom it may concern:*

Be it known that I, EDWARD L. PERKINS, of Roxbury, in the county of Norfolk and State of Massachusetts, have invented certain Improvements in Machines for Drying Sized Paper and other Fabrics, of which the following is a full, clear, and exact description, reference being had to the accompanying drawings, in which is represented a machine for drying sized paper, constructed in substantial accordance with the principles of my invention, Figures 1 and 2 being central vertical sections at right angles to each other through the machine.

The method heretofore most commonly practiced for drying certain fabrics has been to suspend them in a drying-room through which the atmospheric air was allowed to circulate; but it is manifest that in wet weather, or when the atmosphere is still, the operation will be but sluggishly and imperfectly performed, and that that state of the atmosphere most conducive to the perfect success of the operation will not often exist. It is also evident that when the proper state of the atmosphere does not exist naturally it will not be practicable to remedy the difficulty without the employment of artificial means. For this purpose the goods have been suspended within a close chamber heated by steam, but the heated air soon became loaded with moisture and the operation was but imperfectly and slowly performed. Currents of heated air have also been blown directly upon the goods to be dried, but the want of a sufficient circulation by which the air, when once charged with moisture, could be withdrawn has prevented this plan from becoming ultimately and generally successful.

The process of drying by passing the goods over the surface of cylinders heated with steam will not answer for many fabrics, and is particularly inapplicable to the purpose of drying sized paper, owing to the injurious effect of the steam or vapor thus generated upon the size.

To remedy all these difficulties is the object of my present invention, which consists in an apparatus in which the goods are subjected to the action of a heated atmosphere, which is immediately withdrawn so soon as it is charged with moisture and its place occupied with a fresh supply of heated air, the effect thus produced being similar to the natural current of air upon a bright day, with this advantage—that it need never be interrupted night or day at any season of the year, or in any state of the atmosphere, whether wet or dry, cold or hot.

In the accompanying drawings is represented an apparatus constructed for drying sized paper, in which the paper is stretched vertically over rollers, and is fed continuously through the drying-chamber at the same time that it is exposed to the action of a gentle current of air which enters the chamber through proper inlets in the bottom and is heated by passing in contact with coils of heated pipe, and ultimately escapes through suitable outlets in the top of the chamber provided for the purpose. These inlets and outlets by which the circulation of the air through the chamber is guaranteed are absolutely essential in the carrying out of my invention, as thereby the deleterious effects of a strong blast upon the paper and of the presence of moisture during the operation are avoided, and the process is rendered independent of the hygrometric or thermometric changes of the atmosphere.

*a a* represent the supporting frame-work of the apparatus, at the bottom of which are placed coils of pipes *b b*, heated by steam or otherwise, leaving apertures *c c* at the bottom for the inlet of the atmospheric air, which passes up between the coils and thereby becomes heated. Above the heating apparatus and communicating therewith is a box, *d d*, filled with a series of guiding-rolls, *e e'*, &c., between which the paper *f f* is fed and made to travel vertically, being upon the delivering-roll *g* and received as fast as dried upon the receiving-roll *h*. *i i* are outlets at the top of the apparatus, through which the heated air, steam, &c., finds an easy escape. Air is received through the inlets *c c* at the bottom and passes, as shown by arrows in the drawings, up between the pipes of the heating apparatus and between the guiding-rolls *e e* and out through the apertures *i i*, thereby subjecting the paper to the action of a gentle current of air, which carries off all steam and moisture as fast as it is generated, instead of allowing the moisture to circulate about and remain in contact with the paper, which has heretofore been unavoidable by any mode of drying before attempted.

It will be observed, Fig. 1, that the intermediate guide-rolls, $e'$, are so arranged as to deflect the fabric from the exact plane in which it would otherwise pass from the lower to the upper rolls, $e$. Were the fabric run directly from the lower to the upper carrying-rolls without being deflected in the zigzag course shown in Fig. 1, that part of it which was midway between the rolls would shrink in as it was stretched and be much narrower than the portion which was on the rolls, and as the fabric continued to progress through the machine it would not remain distended upon the rolls, but would wrinkle and ultimately crowd up into a mass or rope near the center of the rolls. This would destroy the value of the machine for most purposes.

The rolls $e$ and $e'$ may in general be placed at a distance of twenty-four inches or thereabout from center to center in a vertical line, and they should be so arranged as to deflect the fabric sufficiently from the general plane in which it moves to keep it constantly tight along the edges, as well as along the center line of the piece.

To prevent injury or strain to delicate fabrics, the carrying-rolls $e$ may have an equal surface-motion imparted to them by means of gearing or otherwise.

What I claim as my invention, and desire to secure by Letters Patent, is—

1. A drying apparatus consisting of the combination of a drying-chamber with inlet and outlet passages for insuring a circulation through it, an apparatus for heating the same, and suitable carrying-rolls for suspending the fabric vertically, or nearly so, in the drying-chamber, and for carrying it into and through the same.

2. The within-described arrangement of the carrying-rolls $e$ and $e'$ with regard to each other, for the purpose of deflecting the fabric from a vertical plane and into a series of zigzag planes, thereby making a series of bearing points, the effect of which is to distend the fabric equally and prevent it from roping up, as set forth.

EDWARD L. PERKINS.

Witnesses:

THOS. R. ROACH,

P. E. TESCHEMACHER.